[72] Inventor Laurence S. Watkins
Highstown, N.J.

[21] Appl. No. 862,358
[22] Filed Sept. 30, 1969
[45] Patented Dec. 28, 1971
[73] Assignee Western Electric Company, Incorporated
New York, N.Y.

[54] PHOTOMASK REGENERATION BY INTENSITY SPATIAL FILTERING

5 Claims, 11 Drawing Figs.

[52] U.S. Cl. .......... 350/162 SF, 356/71
[51] Int. Cl. .......... G02b 27/38
[50] Field of Search .......... 350/162, 162 SF, 71

[56] References Cited

UNITED STATES PATENTS 3,370,268 2/1968 Dobrin et al. .......... 350/162 SF UX
3,409,872 11/1968 Hogg et al. .......... 350/162 SF UX

OTHER REFERENCES

Fraser " Keratins" Scientific American Vol. 221, No. 2, Aug. 1969, pp. 87–96.

*Primary Examiner*—John K. Corbin
*Attorneys*—W. M. Kain, R. P. Miller, R. C. Winter and B. I. Levine

ABSTRACT: An intensity-type spatial filtering technique is employed to generate a corrected replica of a two-dimensional photomask or other pattern containing an array of regularly spaced elements which exhibit nonperiodic errors. A coherent beam of light is diffracted by the mask and focused onto a transparency containing an array of discrete transparent regions against an opaque background. The regions are spaced by a distance inversely proportional to the element spacing on the pattern. The focused light is spatially modulated by the transparency to suppress nonperiodic information contained in the focused light. The spatially modulated light transmitted by the filter is refocused on a photosensitive film which, when developed, defines an array of elements corresponding exactly to the array on the test pattern with the nonperiodic errors removed.

INVENTOR
L. S. WATKINS
BY [signature]
ATTORNEY

PHOTOMASK REGENERATION BY INTENSITY SPATIAL FILTERING

BACKGROUND OF THE INVENTION

In applicant's copending application Ser. No. 858,002 entitled "Photomask Inspection By Intensity Spatial Filtering," there is described a technique for inspecting two-dimensional pattern arrays and especially array-type photomasks employed, e.g., in the large-scale manufacture of semiconductor devices and integrated circuits. Such masks contain a regular distribution of normally identical elements, with each element being representative of an individual device or circuit.

Such photomask inspection is illustratively carried out with the use of an optical spatial filtering technique in which a spatially coherent beam of light is directed at the array mask to diffract the light. The diffracted light is focused on a planar optical filter having a pattern of discrete opaque regions on a transparent field, the regions being spaced by a distance inversely proportional to the element spacing on the mask. The filter spatially modulates the incident diffraction pattern and suppresses the periodic information in the incident light. The spatially modulated light is refocused to produce a visual image of the array with all the periodic information therein suppressed, so that the amplitude distribution of the image is simultaneously representative of all the nonperiodic errors on he mask. The projection of such focused image on a display screen in enlarged form provides an inspector with a rapid and nonfatiguing way of isolating all the nonperiodic errors in the test photomask.

Unfortunately, because of the random nature of the errors uncovered by this technique, the inspector may have difficulty in establishing and adhering to a necessarily subjective, marginal level of acceptability whereby a mask filtering to meet such standard is discarded while a mask meeting the standard is considered acceptable although flawed. The third alternative, repair of a defective mask, is at best tedious and painstaking and is often impractical.

SUMMARY OF THE INVENTION

The present invention provides an optical spatial filtering technique related to that of the above-mentioned copending application for automatically regenerating, on a separate transparency, an error-free replica of the array pattern on a test photomask which may have nonperiodic defects thereon. In this way, all such defects (however serious and great in number) are simultaneously and automatically "repaired" without the necessity of any subjective evaluation on the part of the inspector.

In one illustrative embodiment, the desired result is accomplished by employing, as an optical filter, a distribution of discrete transparent regions (illustratively round dots) on an opaque field, the dots being spaced by a distance inversely proportional to the element spacing on the array to coincide with the distribution of light spots that define the interference function of the photomask under test. When coherent light that is intensity-modulated by a defective test photomask is focused on such a filter, the latter serves to suppress all the nonperiodic information contained in the test mask. The unsuppressed light, spatially modulated by the filter, is then refocused on a photosensitive film. When the so-exposed film is developed, it defines an array of elements exactly corresponding to the array pattern on the test photomask with the nonperiodic errors removed.

In many cases, the exposed film containing the replica array may be directly substituted for the defective test photomask during subsequent steps in the manufacture of the associated integrated circuits or thin film devices.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
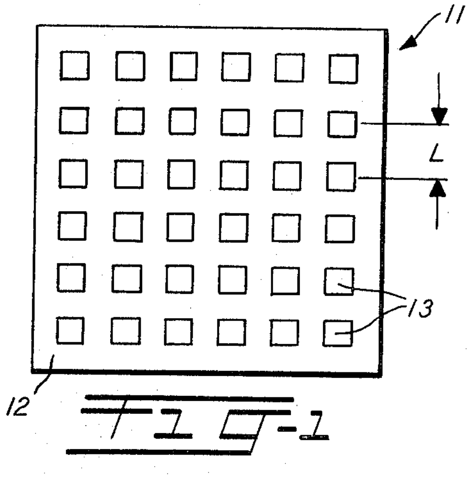
FIG. 1 is a pictorial representation of a photomask transparency having a periodic array of normally identical optical elements.

Referring now to the drawing, FIG. 1 shows a typical integrated circuit mask 11 comprising a transparency 12, such as photographic film, which contains a square planar array of theoretically identical photographic images 13—13 (hereafter "elements 13"). Illustratively, the array consists of six rows of elements with six elements appearing in each row and spaced by a nominal center distance L. For purposes of this description the distance L is assumed to be invariant from element to element.

As shown in FIG. 1, each element 13 defines a prescribed circuit configuration corresponding to that of the resulting integrated circuit. Such configuration is characterized by a predetermined optical density distribution which in the particular case illustrated ideally comprises a plurality of optically opaque areas 14—14 against a transparent background 16.

Figure 2:
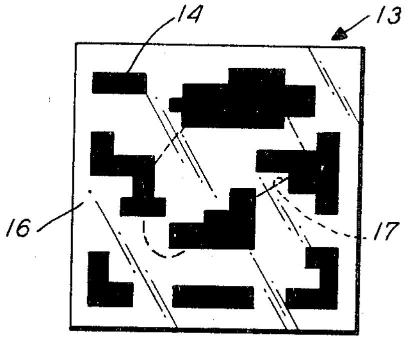
FIG. 2 is an enlarged view of one nominally error-free element on the mask FIG. 1, the element having a first optical configuration.

If the mask is perfect, each of the elements 13 in the mask 11 of FIG. 1 will have the precise configuration shown in FIG. 2. In the manner described in the above-mentioned copending application, however, the mask 11 of FIG. 1 may be susceptible to nonperiodic errors, i.e., errors in one element which are not identically repeated in a cyclic manner in others of the elements. A typical one of such defects, which affects the area shown within the closed dotted line 17 of FIG. 2, represents missing features of the element wherein the normally opaque detail within the line 17 is absent. Such omission of detail, which may be caused by localized defects in the photographic emulsion used to form the mask 11, is shown clearly in FIG. 3.

Such nonperiodic errors on the mask 11 are effectively corrected by generating an error-free replica of the mask array as described below. Such technique may be carried out with the use of the apparatus shown schematically in FIG. 4, which is similar in some aspects to the optical spatial filtering system shown, e.g., in FIG. 1 of U.S. Pat. No. 3,435,244, issued to C. B. Burckhardt et al. on Mar. 24, 1969. Coherent monochromatic light from a laser 18 is directed along a longitudinal axis 19 and through a beam expander 20 comprising a first lens 21 and a pinhole mask 22. The light emanating from the mask 22 passes through a second lens 23 which collimates the light into a plane parallel beam. Such beam is directed through a test mask 11 of the type shown in FIG. 1, whose elements 13 may exhibit nonperiodic defects such as the type illustrated in FIG. 3. The optical grating effect of the element array on the test mask 11 diffracts the incident beam into an intensity-modulated pattern characteristic of the array. A third convex lens 24 focuses the diffraction pattern of the mask on a planar optical filter 26 (described below) located at a focal plane of the lens 24. The filter 26 is of the intensity type, e.g., a type responsive only to the spatial amplitude distribution of the light incident thereon from the lens 24.

The filter 26, which includes a suitable pattern of optically opaque and transparent regions as indicated below, spatially modulates the light incident thereon. Such modulated light is focused by a fourth reimaging convex lens 27 to produce a reconstructed image of the test mask 11 less any information blocked by the filter 26. The reimaged light from the lens 27 exposes a photosensitive film 28 disposed at focal plane on the lens 27 to produce a permanent replica of the reconstructed image.

Figure 5:
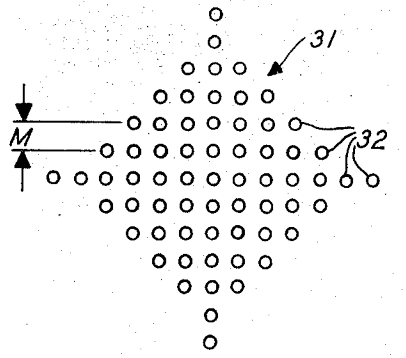
FIG. 5 is a pictorial diagram of the composite diffraction pattern of the mask of FIG. 1.
Figure 6:
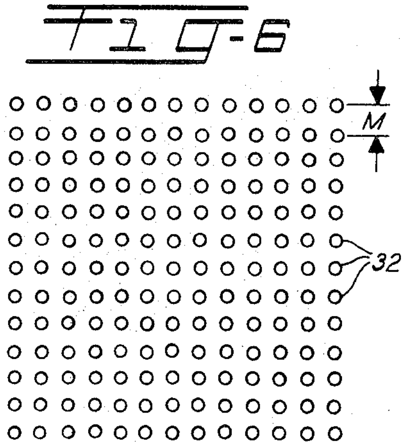
FIG. 6 is a pictorial diagram of the interference function of the mask of FIG. 1.

A properly focused typical diffraction pattern defined by a spatially coherent beam of light that is intensity-modulated by a "standard" mask is shown in FIG. 5. (For purposes of this description, a "standard" mask is one which has the configuration shown in FIG. 1 and which is found to be relatively free from nonperiodic errors upon conventional visual inspection.) Such pattern, represented at 31, is the optical product of (a) the interference pattern of the array, consisting of a regular distribution of light spots 32—32 mutually spaced by a center distance M inversely proportional to the element spacing L, and (b) the diffraction pattern of a single one of the elements 13 (FIG. 1). It will be appreciated that if each of the elements 13 were optically homogenous and of negligible size, the resulting diffraction pattern would be the interference function itself; such function is shown in FIG. 6. Thus, the effect of having a prescribed finite circuit configuration for each element 13 as shown, e.g., in FIG. 2, is to intensity-modulate the regular array of light spots 32 making up the interference function of FIG. 6 into the modulated distribution shown in FIG. 5. It will be noted, however, that the center distance between adjacent light spots in FIGS. 5 and 6 is the same.

Figure 4:
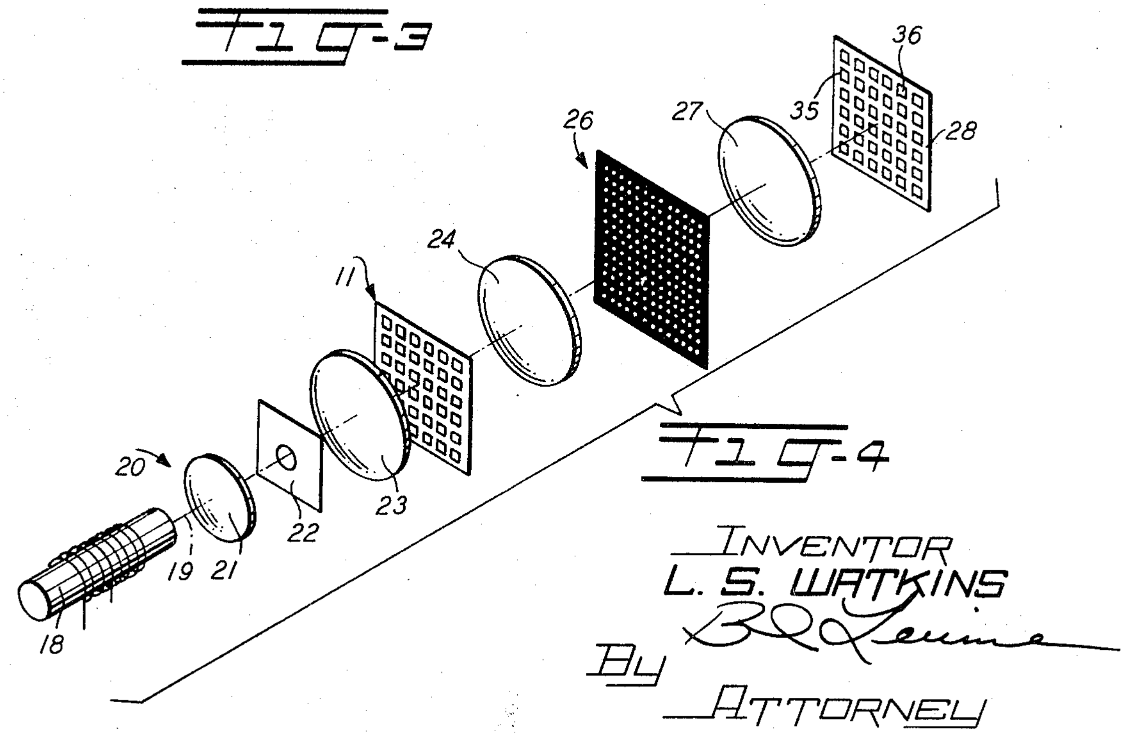
FIG. 4 is an optical system for generating a replica of the photomask of FIG. 4 without any of the nonperiodic errors therein.
Figure 7:
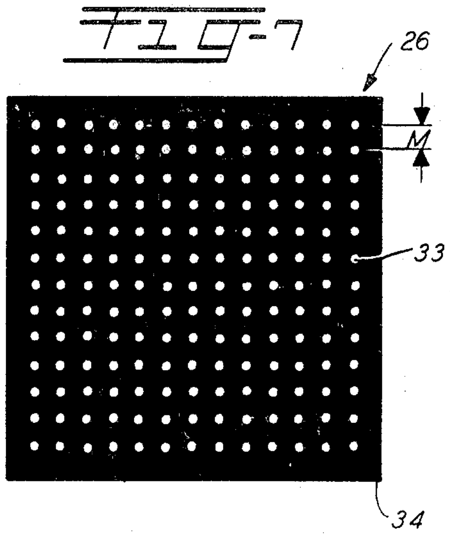
FIG. 7 is a pictorial diagram of an interference-function filter suitable for use in the arrangement of FIG. 4.

In accordance with the invention, the spatial amplitude distribution of one form of the optical filter 26 in the spatial filtering system of FIG. 4 has the form shown in FIG. 7, i.e., a form corresponding to the interference function of FIG. 6. In particular, the filter 26 (FIG. 7) is a transparency containing a plurality of discrete transparent regions 33—33 disposed on an opaque background 34 and spaced by the distance M. Such transparent regions, which are illustratively round dots but may take various other shapes, such as squares, teardrops, etc., are spatially distributed in accordance with the distribution of the light spots 32 in the interference function of FIG. 6.

With this arrangement, when a "standard" test mask is interposed in the arrangement of FIG. 4, the amplitude distribution of light spots of the focused diffraction pattern incident on the filter 26 when the latter has the configuration shown in FIG. 7 will be exactly coincident with the distribution of the transparent dots on the filter. Consequently, all the focused light incident on the filter 26 will be transmitted thereby and will be reimaged by the lens 27 onto the photosensitive film 28. The resulting exposed pattern on the transparency 28 will, after suitable developing, define an array 35 which is an exact replica of the error-free array 12 on the assumed perfect test mask 11.

Such an interference-function filter acts as a periodic comparator which selectively permits the transmission therethrough of light which is spatially distributed in the form of bright spots separated by the center distance M; such spatial distribution, in turn, is characteristic of both the interference function and the diffraction pattern of a "standard" mask as defined above.

If, on the other hand, the test mask 11 is not ideal but exhibits nonperiodic errors, the distribution of the light on the diffraction pattern incident on the filter 26 will not coincide at all points with the distribution of transparent dots across the filter, and a certain amount of information contained in the incident light will be suppressed or blocked. Because the configuration of the filter 26 matches the interference function of an ideally periodic photomask array, the light transmitted through the filter contains all the desired information relating to the periodic components of the photomask. Such periodic information includes not only data relevant to the interference function of the array but also the optical detail of the individual elements 13 (e.g., the detail shown in the areas 14 of FIG. 2) which is designed to be identically repeated from element to element; only the additions to or deletions from such repetitive detail, which make up the nonperiodic errors, will be blocked. Thus the light transmitted through the filter 26 (FIG. 4), when reimaged by the lens 27, exposes the film 28 in a array pattern which corresponds exactly to the ideal array pattern of the test mask 11 despite the presence of the nonperiodic errors in the photomask 11. Moreover, every element (designated 36) of the exposed pattern on the film 28 contains an exact replica of the desired optical detail of an element 13 on the test mask 11. The film 28, after developing, will therefore be a corrected version of the test mask 11 and in many cases can be substituted directly for the test mask 11 in the later processing stages of the associated integrated circuits.

Figure 3:
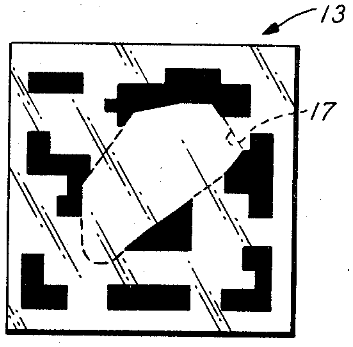
FIG. 3 is an enlarged view of the element of FIG. 2 when a nonperiodic defect is present in a central region thereof.

It is important to note that the required correction of a flawed mask can be effected by this technique irrespective of whether the defects are transparent, as in FIG. 3, or opaque. This provides the equivalent of both filling in detail missing on the test mask 11 and of eliminating spurious additional detail.

An additional advantage when employing the interference-function filter of FIG. 7 is its capability of regenerating nonperiodic errors in the mask 11 irrespective of the exact configuration of the individual elements 13, provided only the center distance between such elements is maintained at the spacing L. Hence, the same filter can be used to correct a wide variety of device and circuit patterns in a two-dimensional array.

Figure 8:
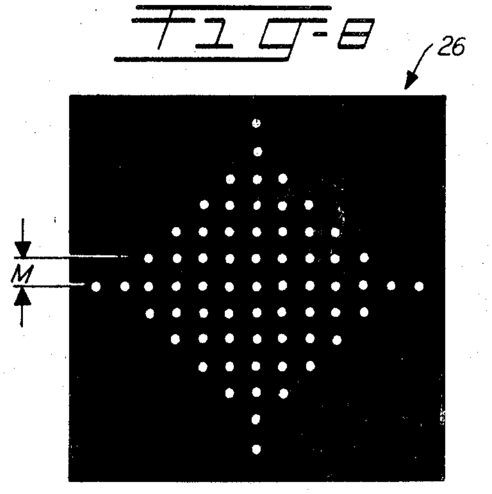
FIG. 8 is a pictorial diagram of a diffraction-pattern filter suitable for use in the arrangement of FIG. 4.

An alternative form of the filter 26 is shown in FIG. 8. This form of filter has an amplitude distribution of transparent dots which corresponds to the mask diffraction pattern shown in FIG. 5. Such a diffraction-pattern filter may be conveniently constructed by exposing a suitable photographic film at the focal plane of the lens 24 when the "standard" mask 11, as defined above, is being tested. In such a case, the laser 18 is energized to expose the film, after which the latter is removed, developed, and printed to form the required configuration of transparent dots shown in FIG. 8. The developed film may then be reinserted in the system of FIG. 4 to serve as the optical filter.

It is apparent that the filter of FIG. 8 may also be constructed on the basis of theoretical calculations of the diffraction pattern of an error-free mask 11, particularly where the elements 13 have a mathematically simple optical density configuration.

Since the diffraction pattern of FIG. 5 contains information not only pertinent to the array of grating effect of the mask but also the the detail of the particular configuration used for the elements 13, this second type of filter is inherently more restricted in application than the interference-function filter of FIG. 7.

Figure 9:
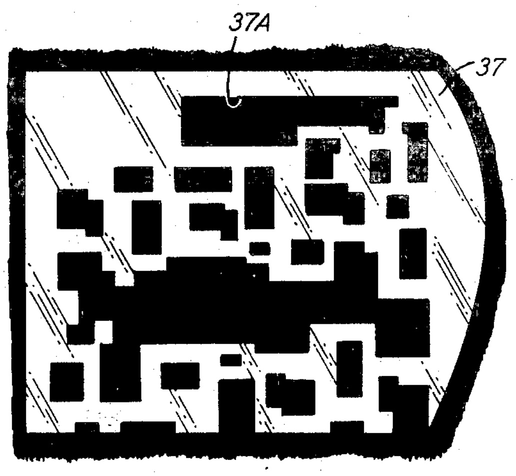
FIG. 9 is an enlarged view, similar to FIG. 2, of a nominally error-free element having a second optical configuration.
Figure 10:
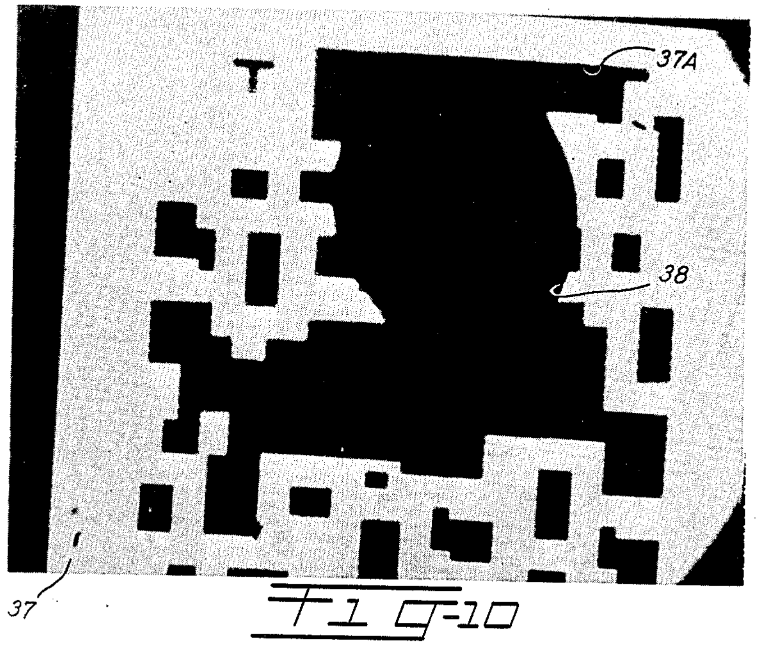
FIG. 10 is a photograph of a defective element on a practical photomask having a regular array of elements each constructed as shown in FIG. 9, the defect consisting of missing detail in a central region of the element.
Figure 11:
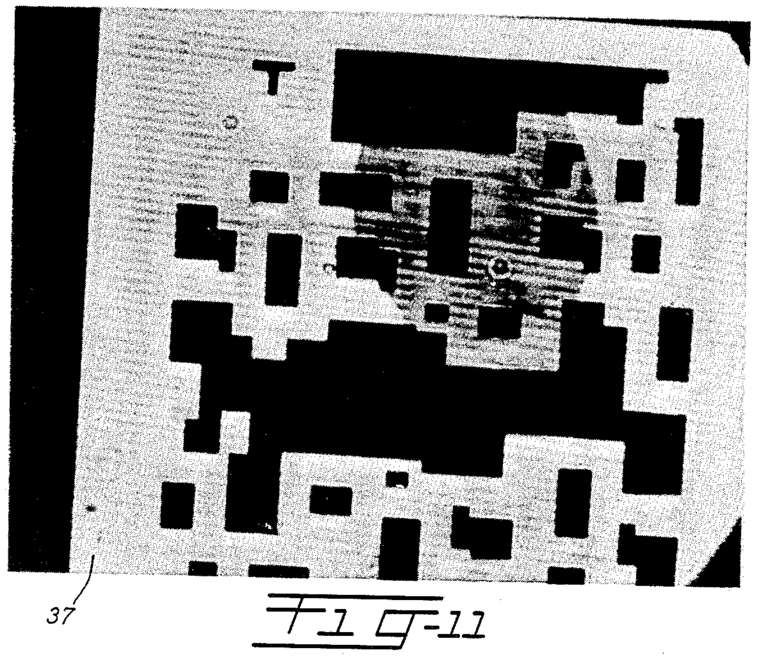
FIG. 11 is a photograph of a corrected replica of the element of FIG. 10 produced by employing an interference-function filter in accordance with the invention.

FIGS. 9-11 illustrate typical results obtained when using the technique of the invention in connection with an interference-function filter to correct nonperiodic errors on a practical photomask having an array of elements. As shown in FIG. 9 each such element (designated 37) ideally has opaque areas 37A—37A against a transparent background. FIG. 10 shows a photograph of a flawed element on such a mask, the flaw being bounded by a closed line 38 in a central region of the element.

Theoretical calculations on the array or grating factor of the mask (which has a center spacing between elements of 62 mils) indicated that the bright spots of the corresponding focused interference function would be mutually spaced apart by a center distance of 1.6 mils when a 6,328 A. light wavelength and a lens focal length of 100 mm. are employed. From these calculations, a filter having a two-dimensional array of transparent round dots spaced by a corresponding center distance of 1.6 mils was constructed on a dark background. The dot diameter was selected to be 0.8 mils.

The defective test mask of FIG. 10 was employed as the workpiece in the arrangement of FIG. 4, and the interference-function filter just described was disposed at the focal plane of the lens 24. A beam of light from a 15 milliwatt 6,328 A. laser was modulated by the mask and the corresponding diffraction pattern was focused on the filter, which transmitted only the periodic components of the incident light to generate the replica array on the film 28. The element on the replica array corresponding to the flawed element of FIG. 10 had the appearance shown in FIG. 11. As shown, such replica element exhibited the required optical detail missing from the defective element of FIG. 10.

While the invention has been specifically described in connection with the regeneration of array-type photomasks, it will be understood that any other suitable two-dimensional array of nominally identical elements mutually spaced apart by a predetermined distance may be similarly regenerated.

What is claimed is:

1. A method of suppressing nonperiodic errors in a two-dimensional array of nominally identical elements mutually spaced apart by a predetermined distance, which comprises the steps of:

directing a spatially coherent beam of light at the array to diffract the light;

focusing the diffracted light on a filter containing a plurality of discrete transparent regions on an opaque field, the transparent regions being spaced by a distance inversely proportional to the predetermined distance to spatially modulate the intensity of the focused light; and reimaging the spatially modulated light to form an image of the array with the nonperiodic errors removed.

2. A method as defined in claim 1 in which the directing step is accomplished with a photomask as the two-dimensional array.

3. A regenerative method of correcting nonperiodic errors on a two-dimensional test array of nominally identical elements mutually spaced apart by a predetermined distance, which comprises the steps of:

directing a spatially coherent beam of light at the test array to diffract the light;

focusing the diffracted light on a filter containing a plurality of discrete transparent regions on an opaque field, the transparent regions being distributed in accordance with the interference function of the array and spaced by a distance inversely proportional to the predetermined distance to spatially modulate the intensity of the focused light;

reimaging the spatially modulated light; and exposing a photosensitive surface to the reimaged light to define, on the surface, a regular array of elements corresponding to the test array but without the nonperiodic errors thereon.

4. Apparatus for producing an error-free replica of a two-dimensional test array of normally identical elements nominally spaced apart by a predetermined distance but susceptible to nonperiodic errors, which comprises:

means for directing spatially coherent beams of light as the test array to diffract the light;

a first lens positioned to focus the light diffracted by the test array;

a planar optical filter containing a distribution of discrete transparent regions on an opaque field, the transparent regions being distributed in accordance with the interference function of the array and spaced by a distance inversely proportional to the predetermined distance, the filter being positioned at the focal plane of the first lens for spatially modulating the light focused by the first lens;

a second lens positioned to reimage the light spatially modulated by the filter; and a photosensitive surface located at the focal plane of the second lens for receiving the light focused thereby, the last-mentioned light exposing the surface in a pattern defining an array of elements corresponding to the test array but without the nonperiodic errors thereon.

5. A method of manufacturing a photomask free of nonperiodic error, for use in the fabrication of integrated electronic circuits, and the like, said photomask comprising a two-dimensional array of nominally identical mask features, mutually spaced apart by a predetermined distance, comprising the steps of:

directing a spatially coherent beam of radiant energy at a defective photomask, which comprises a two-dimensional array of nominally identical mask features, mutually spaced apart by a predetermined distance but which is known to include at least one nonperiodic error, to diffract the radiant energy;

focusing the diffracted radiant energy onto a filter containing a plurality of discrete regions which are transparent, to said radiant energy, on an opaque field, said transparent regions being distributed in accordance with the interference function of the array and spaced apart by a distance inversely proportional to said predetermined distance, to spatially modulate the intensity of the focused radiant energy;

reimaging the spatially modulated radiant energy 20 to expose a surface sensitive to said radiant energy, to define of said surface a regular array of photomask features corresponding to the features on the defective mask, but which has said at least one nonperiodic error removed, whereby said error-free photomask is produced.

* * * * *

L-566-PT
(6-69)

UNITED STATES PATENT OFFICE
CERTIFICATE OF CORRECTION

Patent No. 3,630,596 Dated December 28, 1971

Inventor(s) L. S. Watkins

It is certified that error appears in the above-identified patent and that said Letters Patent are hereby corrected as shown below:

Column 1, line 27 "he" should read --the--; line 34 "filtering" should read --failing--. Column 2, line 42 "FIG. 1" should read --FIG. 2--; line 64 "aspects" should read --respects--. Column 3, line 14 "on the" should read --of the--. Column 4, line 13 "a array" should read --an array--; lines 51-52 "configuration" should read --distribution--; line 56 "the the" should read --to the--. Column 5, line 30 "being spaced" should read --being distributed in accordance with the interference function of the array and spaced--. Column 6, line 8 "as the" should read--at the--; line 46 delete "20"; line 48 "of said" should read --on said--.

Signed and sealed this 30th day of May 1972.

(SEAL)
Attest:

EDWARD M.FLETCHER,JR.
Attesting Officer

ROBERT GOTTSCHALK
Commissioner of Patents